(12) United States Patent
Greenberg

(10) Patent No.: US 7,480,012 B1
(45) Date of Patent: Jan. 20, 2009

(54) MULTIPLEXED VIDEO DIGITIZATION SYSTEM AND METHOD

(75) Inventor: Robert Y. Greenberg, Portland, OR (US)

(73) Assignee: Pixelworks, Inc., Tualatin, OR (US)

( * ) Notice: Subject to any disclaimer, the term of this patent is extended or adjusted under 35 U.S.C. 154(b) by 600 days.

(21) Appl. No.: 11/066,711

(22) Filed: Feb. 24, 2005

(51) Int. Cl.
  *H04N 5/268* (2006.01)
(52) U.S. Cl. .................................... 348/572; 348/705
(58) Field of Classification Search .................. 348/572, 348/573, 705, 706, 555, 584; 341/126, 155; *H04N 5/268, H04N 5/46, 9/74*
  See application file for complete search history.

(56) References Cited

U.S. PATENT DOCUMENTS

| | | | |
|---|---|---|---|
| 5,351,129 A * | 9/1994 | Lai | 348/584 |
| 6,078,361 A | 6/2000 | Reddy | |
| 6,097,443 A * | 8/2000 | Volmari | 348/572 |
| 6,272,181 B1 * | 8/2001 | Matt | 348/572 |
| 6,441,861 B2 * | 8/2002 | Vaughan et al. | 348/706 |
| 7,030,796 B2 * | 4/2006 | Shim et al. | 341/155 |
| 2004/0012697 A1 * | 1/2004 | Rossi | 348/308 |

* cited by examiner

*Primary Examiner*—Sherrie Hsia
(74) *Attorney, Agent, or Firm*—Marger Johnson & McCollom, P.C.

(57) ABSTRACT

The invention relates to a multiplexed video digitization system and method. The system includes a plurality of analog video signals, a multiplexer to select one of the plurality of analog video signals, and an analog-to-digital converter to convert the selected analog video signal into a digital video signal. The plurality of analog video signals may include component video signals, red, green, and blue signals, or s-video signals. The multiplexer may include control logic to select the one of the plurality of analog video signals. The system may include a plurality of sample and hold circuits to insure time aligned sampling of the corresponding plurality of video signals.

29 Claims, 3 Drawing Sheets

MULTIPLEXED VIDEO DIGITIZATION SYSTEM AND METHOD

INVENTION FIELD

This invention relates to a video digitization system and method and, more particularly, to a multiplexed video digitization system and method.

INVENTION BACKGROUND

Modern televisions and other electronic devices receive video signals that typically must be digitized before being processed. These analog video signals come in various formats. Composite video signals, for example, contain chrominance (hue and saturation) and luminance (brightness) information, along with synchronization and blanking pulses, all together in a single signal. Component video signals contain a number of distinct signals, each carrying a component of the total video information. Examples of component video signals are red, green, and blue (RGB) signals where each signal represents one of the primary colors. Another example of component video signals are luminance signal Y and color difference signals $P_B$ and $P_R$, where each signal is a linear combination of signals representing the three primary colors. Yet another example is S-video, sometimes referred to as Y/C video, in which the luminance signal Y and the chrominance signal C are transmitted separately to achieve superior picture clarity. The luminance signal Y carries brightness information that defines the black and white portion, and the chrominance signal C carries color information that defines hue and saturation.

FIG. 1 is a block diagram of a typical digitization system 10. Referring to FIG. 1, the digitization system 10 includes channels 11, 12, and 13 to receive a plurality of video signals, e.g., R, G, and B signals respectively. Or channels 11, 12, and 13 may receive $P_R$, Y, $P_B$ signals respectively. The digitization system 10 uses one analog-to-digital converter (ADC) per channel, three ADCs 21, 22, and 23 to receive the R, G, and B signals on corresponding channels. Three ADCs 21, 22, and 23 are typically required to digitize the $P_R$, Y, and $P_B$ signals comprising a component video signal. Two ADCs 22 and 23 are required to digitize S-video signals, one for each of the luminance Y and chrominance C signals.

Digitization systems with multiple ADCs, like system 10, require large silicon die areas making them expensive to design, test, and manufacture. And digitization systems with multiple ADCs, like system 10, consume large power amounts.

Accordingly, a need remains for an improved video digitization system and method.

BRIEF DRAWINGS DESCRIPTION

The foregoing and other objects, features, and advantages of the invention(s) will become more readily apparent from the detailed description of invention embodiments that references the following drawings.

DETAILED INVENTION EMBODIMENT DESCRIPTION

Figure 1:
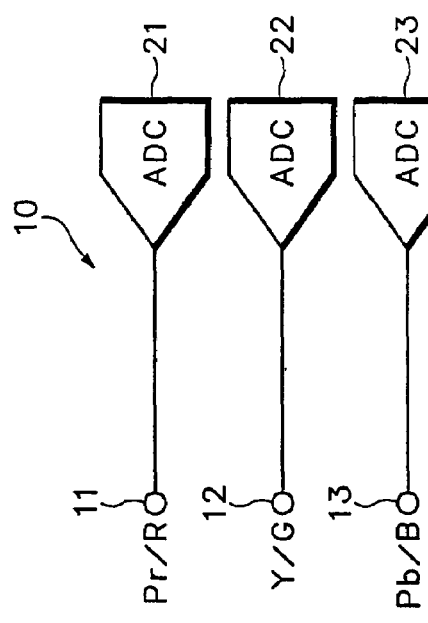
FIG. 1 is a block diagram of a typical digitization system 10.
Figure 2:
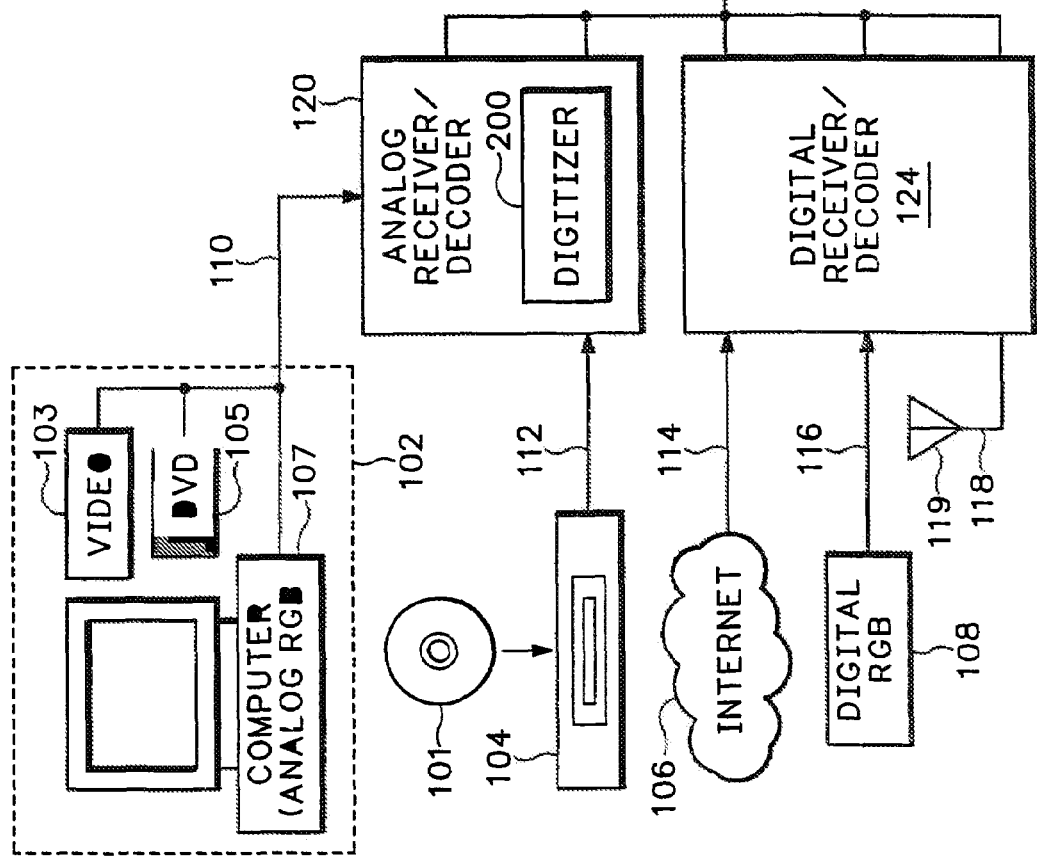
FIG. 2 is a block diagram of a display system 100.

FIG. 2 is a block diagram of a display system 100. Referring to FIG. 2, the system 100 includes an analog signal receiver 120 for receiving an analog image data signal 110, e.g., composite video RGB, Y, $P_B$, and $P_Y$ or S-video signals, from a source 102. The source 102 may be a personal computer 107, a digital video disk player 105, set top box (STB) 103, or any other device capable of generating the analog image data signal 110. Likewise, the receiver 120 decodes an analog video signal 112, e.g., composite video RGB, Y, $P_B$, and $P_Y$ or S-video signals, from a video source 104. The video source 104 may be a video camcorder, tape player, digital video disk (DVD) player, or any other device capable of generating the analog video signal 112. The video source 104 may read (or play) external media 101. In an embodiment, a DVD player 104 plays the DVD 101. In another embodiment, a VHS tape player 104 plays a VHS tape 101. The decoder 120 converts the analog image signal 110 or analog video signal 112 into the digital video signal 109 and provides it to the panel controller 150. The decoder 120 is any device capable of generating digital video signal 109, e.g., in Y/C or CVBS format, from the analog image data 110 or analog video signal 112.

A digital signal receiver 124 receives data 114 from a global computer network 106 such as the Internet®. The data 114 may be in any format capable of transmission over the network 106. In an embodiment, the data 114 is packetized digital data. The digital signal receiver 124 may further receive digital signals 116 from a digital source 108. In an embodiment, the source 108 provides digital RGB signals 116 to the receiver 124. The digital signal receiver 124 may further receive a wireless signal 118 transmitted by the antenna 119. The antenna 119 is any device capable of wirelessly transmitting or broadcasting the signal 118 to the receiver 124. In an embodiment, the antenna 119 transmits a digital television signal 118 to the receiver 124. The antenna 119 may alternatively wirelessly transmit and/or broadcast an analog television signal 118 to the receiver 120 for digitization.

The digital signal receiver 124 may include a modem or network interface card (NIC), a Digital Visual Interface (DVI) or high definition multimedia interface (HDMI), a digital modem or any device capable of receiving data 114 from a network 106, any device capable of receiving a signal 118 transmitted wirelessly by any other device, e.g., the antenna 119, and/or any device capable of receiving a digital signal 112, 114, and/or 116. The receiver 124 provides the digital video signal 109 to the controller 150. A person of skill in the art knows well the design of the digital receiver 124.

The digital video signal 109 may be in a variety of formats, including composite or component video. The digital video signal 109 may be a stream of digital numbers describing a continuous analog video waveform in either composite or component form. FIG. 2 describes a variety of devices (and manners) in which the digital video signal 109 may be generated from an analog video signal or other sources. A person of reasonable skill in the art should recognize other devices for generating the digital video signal 109 come within the scope of the present invention.

The controller 150 generates image data 132 and control signals 133 by manipulating the digital video signal 109. The display controller 150 provides the image data 132 and control signals 133 to a display device 160. The display 160 includes a pixelated display that has a fixed pixel structure or a CRT. Examples of pixelated displays are active and passive LCD displays, plasma displays (PDP), field emissive displays (FED), electro-luminescent (EL) displays, micro-mirror technology displays, low temperature polysilicon (LTPS) displays, liquid crystal on silicon (LCOS), and the like. A person of reasonable skill in the art should recognize that display 160 may be a television, monitor, projector, personal digital assistant, and other like applications.

The controller 150 may include a variety of components to process the digital video signal 109 for display on the panel 160. The controller and its associated components may be integrated into a monolithic integrated circuit or hardwired using any number of discrete logic and other components. Alternatively, the controller 150 may be a dedicated processor system that includes a microcontroller or a microprocessor (not shown separately).

In an embodiment, the controller 150 may scale the digital video signal 109 for display by the panel 160 using a variety of techniques including pixel replication, spatial and temporal interpolation, digital signal filtering and processing, and the like. In another embodiment, the controller 150 may additionally change the resolution of the digital video signal 109, changing the frame rate and/or pixel rate encoded in the digital video signal 109. Scaling, resolution, frame, and/or pixel rate conversion, and/or color manipulation are not central to this invention and are not discussed in further detail.

Read-only (ROM) and random access (RAM) memories 140 and 142, respectively, are coupled to the display system controller 150 and store bitmaps, FIR filter scaling coefficients, and the like. A person of reasonable skill in the art should recognize that the ROM and RAM memories 140 and 142, respectively, may be of any type or size depending on the application, cost, and other system constraints. A person of reasonable skill in the art should recognize that the ROM and RAM memories 140 and 142, respectively, are optional in the system 100. A person of reasonable skill in the art should recognize that the ROM and RAM memories 140 and 142, respectively, analog receiver 120, and/or digital receiver 124 may be external or internal to the controller 150. RAM memory 142 may be a flash type memory device. Clock 144 controls timing associated with various operations of the controller 150.

Figure 3:
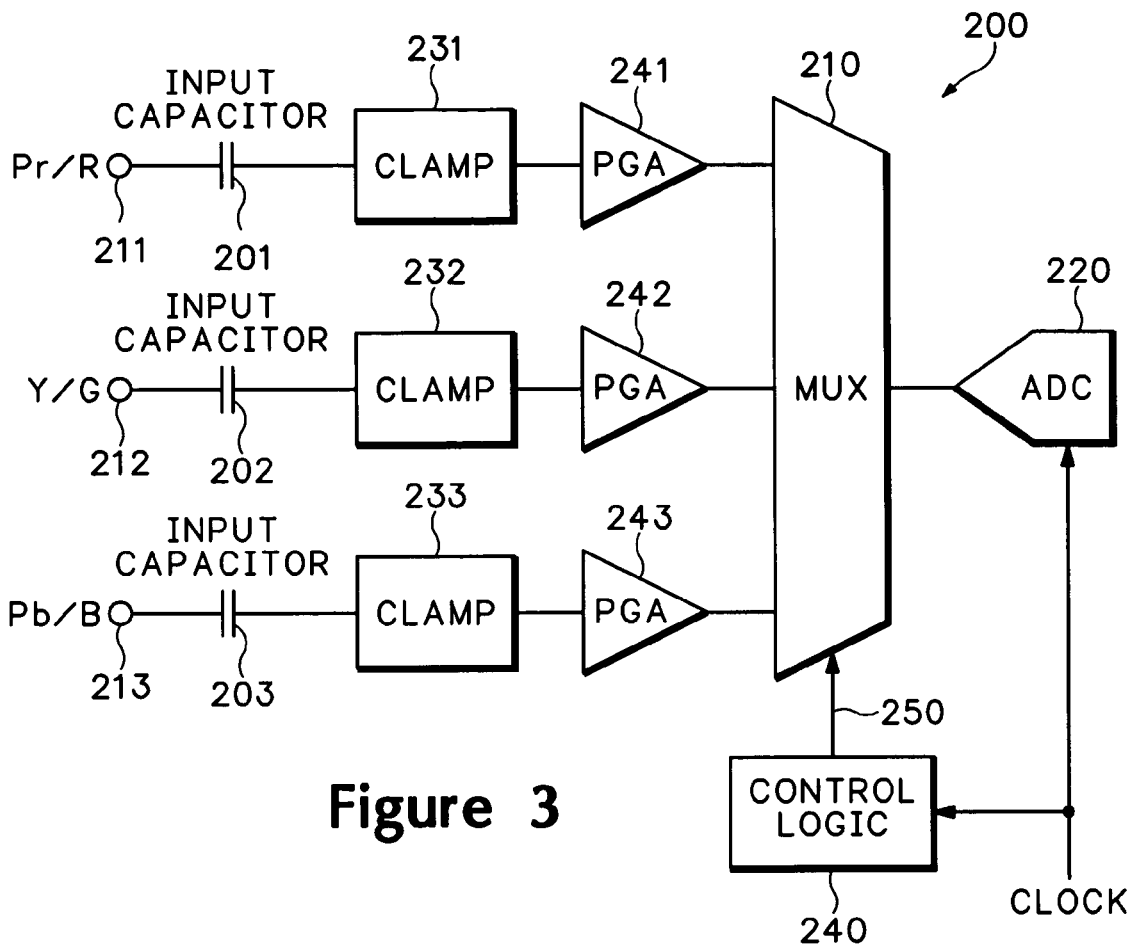
FIG. 3 is a block diagram of an embodiment of a digitization system 200.

FIG. 3 is a block diagram of an embodiment of a digitization system 200. To the extent that analog receiver 120 receives an analog video signal, it may also include a digitization system 200 as shown in FIG. 3. Referring to FIG. 3, the digitization system 200 includes channels 211, 212, and 213 to receive a plurality of analog video signals, e.g., R, G, and B signals respectively. Or the channels 211, 212, and 213 may receive $P_R$, Y, and $P_B$ signals respectively. Each of the plurality of analog video signals is provided to a corresponding input capacitor, clamp, and programmable gain amplifier. For example, the red signal R (or $P_R$) on channel 211 is provided to a capacitor 201, clamp 231, and a programmable gain amplifier 241. Likewise, the green and blue signals G and B (or Y and $P_B$) on channels 212 and 213 are provided to clamps 232 and 233 and programmable gain amplifiers 242 and 243 respectively. The input capacitors 201, 202, and 203, clamps 231, 232, and 233, and the programmable gain amplifiers 241, 242, and 243 filter the analog video signal for conversion into a digital video signal 109 by the ADC 220. A person of reasonable skill knows well the operation and design of the input capacitors 201, 202, and 203, the clamps 231, 232, and 233, and the programmable gain amplifiers 241, 242, and 243.

The digitization system 200 uses a single ADC for all channels 211, 212, and 213 thereby reducing necessary silicon die area consequently reducing design, test, and manufacturing costs and power consumption. A multiplexer 210 selects one of the plurality of analog video signals on channels 211, 212, and 213 to provide to the ADC 220 responsive to a control signal 250. For example, the multiplexer 210 may select the red signal R to provide to the ADC 220 for conversion into a digital red signal R. Similarly, the multiplexer 210 may select the green signal G to provide to the ADC 220 for conversion into a digital green signal G. And so on.

Figure 4:
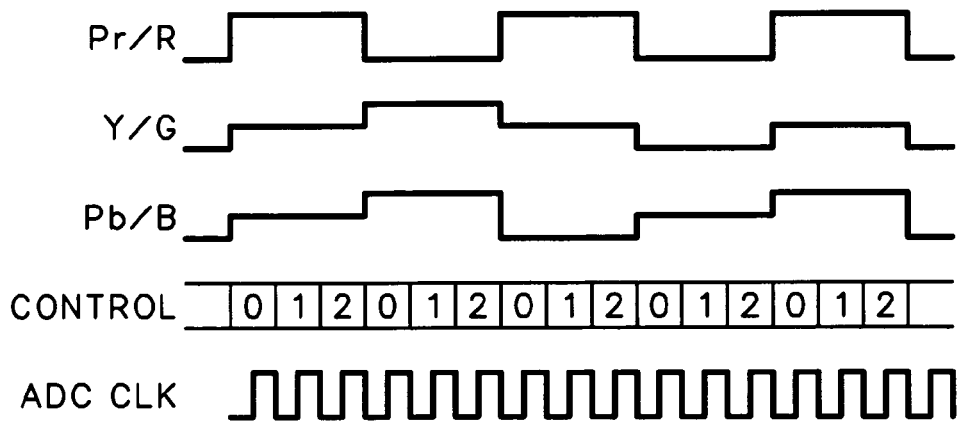
FIG. 4 is a timing diagram associated with the digitization system 200 shown in FIG. 3.

FIG. 4 is a timing diagram associated with the digitization system 200 shown in FIG. 3. Referring to FIGS. 3-4, the multiplexer 210 selects one of the plurality of the analog video signals responsive to the control signal 250. A control logic block 240, in turn, generates the control signal 250 responsive to a clock signal. In an embodiment, the clock signal may be common between the control logic 240 and the ADC 220. The multiplexer 210 may sequentially select each of the plurality of analog video signals responsive to the clock signal. For example, the multiplexer 210 may select the R signal responsive to a control signal in a first logic state, e.g., 0, on a rising edge of the clock signal. The multiplexer 210 may then select the G and B signals responsive to a control signal in second and third logic states, e.g., 1 and 2, on the next two rising edges of the clock signal, respectively, as shown in FIG. 4. A person of reasonable skill in the art should recognize that many other embodiments of the control signal 250 and the control logic 240 are possible and come within the scope of the present invention.

Figure 5:
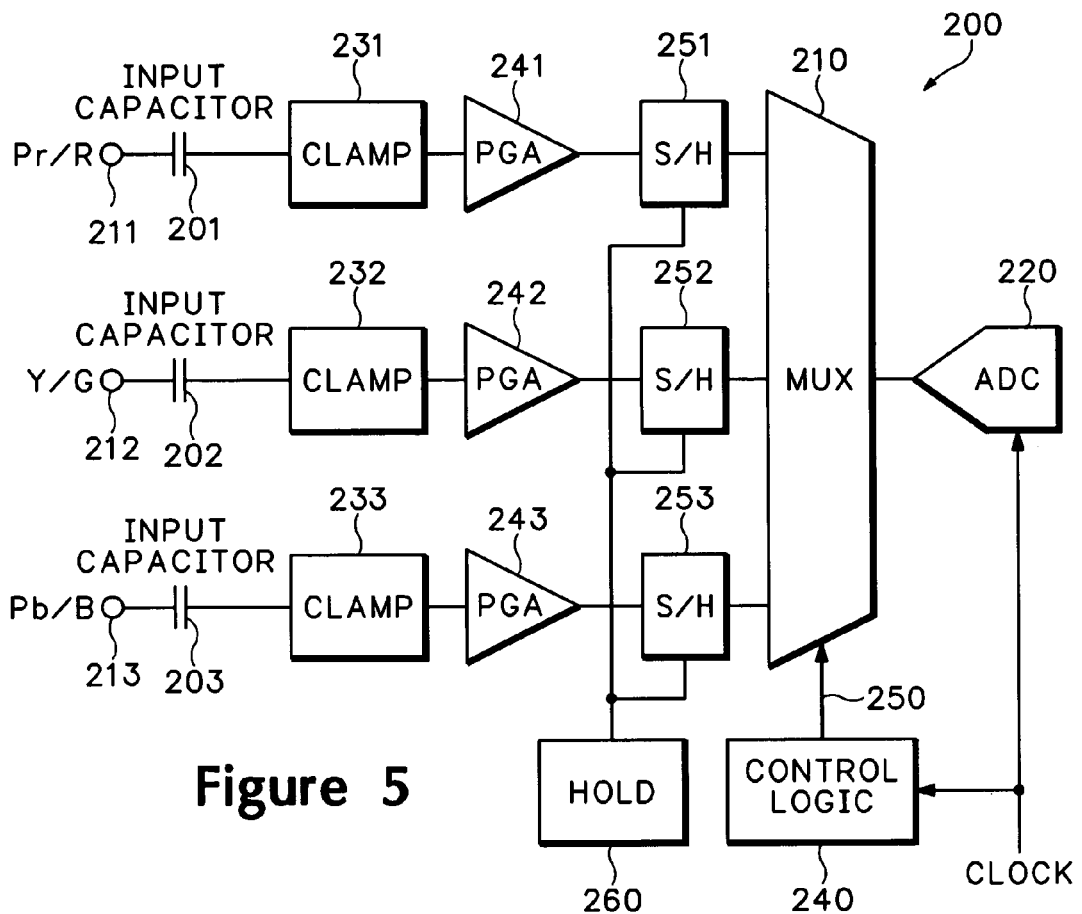
FIG. 5 is a block diagram of an alternate embodiment of a digitization system 200.
Figure 6:
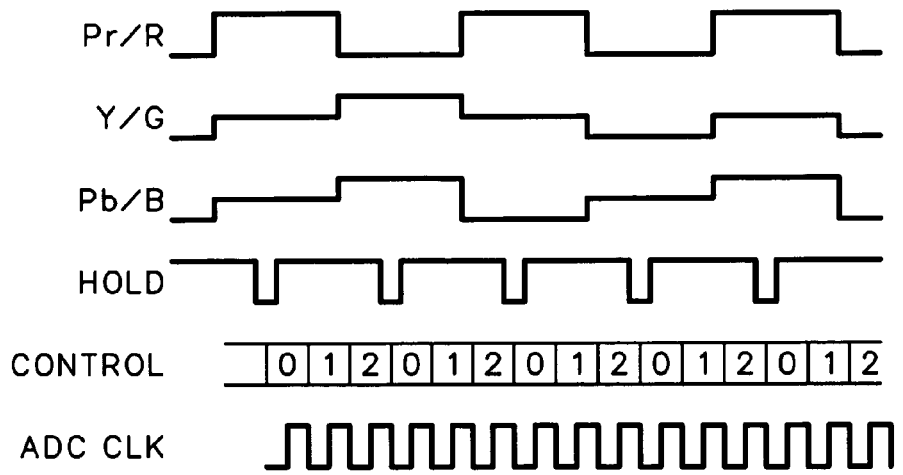
FIG. 6 is a timing diagram associated with the digitization system 200 shown in FIG. 5.

FIG. 5 is a block diagram of an alternate embodiment of a digitization system 200. FIG. 6 is a timing diagram associated with the digitization system 200 shown in FIG. 5. Referring to FIGS. 5 and 6, the digitization system 200 includes sample and hold circuits 251, 252, and 253 associated with corresponding analog video channels 211, 212, and 213 respectively. The sample and hold circuits 251, 252, and 253 may be positioned between the programmable gain amplifiers 241, 242, and 243 and the multiplexer 210. The sample and hold circuits 251, 252, and 253 operate responsive to a hold signal 260 and insure that the plurality of channels 211, 212, and 213 are sampled at the same time instant (that is, time aligned), even though the multiplexer 210 may sequentially process the sampled signals stored in the sample and hold circuits 251, 252, and 253.

The ADC 220 may be a so-called fast converter to allow time multiplexing of the plurality of analog video signals. In an embodiment, the system 200 uses a single ADC 220 to digitize component video and analog RGB signals. The ADC 220 may have a sampling rate that is proportional to a desired sampling rate times a number of channels or signals sampled. For example, to digitize 1080i component video (80 MHz×3 channels), a single 240 MHz ADC 220 may be used. For another example, to digitize SXGA 75 Hz analog RGB signals, (135 MHz×3 channels), a single 405 MHz ADC 220 may be used. To digitize s-video (27 MHz×2 channels), a single 54 MHz ADC 220 may be used. To digitize component 480i component video (27 MHz×3 channels), a single 81 MHz ADC 220 may be used. And so on.

Having illustrated and described the principles of our invention(s), it should be readily apparent to those skilled in the art that the invention(s) can be modified in arrangement and detail without departing from such principles. I claim all modifications coming within the spirit and scope of the accompanying claims.

I claim:

1. A system comprising:
   a plurality of analog video signals;
   a multiplexer to select one of the plurality of analog video signals as an output signal;
   an analog-to-digital converter to convert the output signal into a digitized signal;
   control logic to cycle a selection of the multiplexer to each of the plurality of analog video signals within a time period related to a bandwidth of one of the analog video signals.

2. The system of claim 1 where the plurality of analog video signals includes component video signals.

3. The system of claim 1 where the plurality of analog video signals includes red, green, and blue signals.

4. The system of claim 1 where the plurality of analog video signals includes s-video signals.

5. The system of claim 1 where the multiplexer is adapted to sequentially select each of the plurality of analog video signals.

6. The system of claim 1 where the analog-to-digital converter includes a sample rate proportional to a desired sample rate times a number of analog video signals.

7. The system of claim 1 comprising a clamp and a programmable gain amplifier for each of the plurality of video signals.

8. The system of claim 1 comprising a plurality of sample and hold circuits to sample the plurality of analog video signals.

9. The system of claim 1 where the analog-to-digital converter includes a sample rate greater than a bandwidth of one of the analog video signals times a number of analog video signals.

10. The system of claim 1 where the plurality of analog video signals form a single video input signal for display.

11. A system comprising:
    means for receiving a plurality of analog video signals;
    means for selecting one of the plurality of analog video signals as an output signal;
    means for converting the output signal to a digitized signal; and
    means for cycling a selection of the means for selecting to each of the plurality of analog video signals within a time period related to a bandwidth of one of the analog video signals.

12. The system of claim 11 where the means for receiving includes means for receiving component video signals.

13. The system of claim 11 where the means for receiving includes means for receiving red, green, and blue signals.

14. The system of claim 11 where the means for receiving includes means for receiving s-video signals.

15. The system of claim 11 where the means for selecting is adapted to sequentially select each of the plurality of analog video signals.

16. The system of claim 11 where the means for converting includes a sample rate proportional to a desired sample rate times a number of analog video signals.

17. The system of claim 11 comprising:
    means for clamping each of the plurality of analog video signals; and
    means for amplifying each of the plurality of analog video signals.

18. The system of claim 11 comprising means for sampling the plurality of analog video signals.

19. A method comprising:
    receiving a plurality of analog video signals;
    selecting one of the plurality of analog video signals as an output signal; and
    converting the output signal into a digitized signal; and
    cycling the selection of the one the plurality of analog video signals to each of the plurality of analog video signals within a time period related to a bandwidth of one of the analog video signals.

20. The method of claim 19 where receiving a plurality of analog video signal includes receiving component video signals.

21. The method of claim 19 where receiving the plurality of analog video signals includes receiving red, green, and blue signals.

22. The method of claim 19 where receiving the plurality of analog video signals includes receiving s-video signals.

23. The method of claim 19 where selecting one of the plurality of analog video signals includes sequentially selecting each of the plurality of analog video signals.

24. The method of claim 19 where converting the selected analog video signal includes converting the selected analog video signal at a sample rate proportional to a desired sample rate times a number of analog video signals.

25. The method of claim 19 comprising:
    clamping each of the plurality of analog video signals; and
    programmably amplifying gain associated with each of the plurality of analog video signals.

26. The method of claim 19 comprising sampling and holding the plurality of analog video signals.

27. A system comprising:
    a plurality of analog video signals;
    a multiplexer to select one of the plurality of analog video signals; and
    an analog-to-digital converter to convert the selected analog video signal into a digital video signal;
    where the analog-to-digital converter includes a sample rate proportional to a desired sample rate times a number of analog video signals.

28. A system comprising:
    means for receiving a plurality of analog video signals;
    means for selecting one of the plurality of analog video signals; and
    means for converting the selected analog video signal to a digital video signal;
    where the means for converting includes a sample rate proportional to a desired sample rate times a number of analog video signals.

29. A method comprising:
    receiving a plurality of analog video signals;
    selecting one of the plurality of analog video signals; and
    converting the selected analog video signal into a digital video signal;
    where converting the selected analog video signal includes converting the selected analog video signal at a sample rate proportional to a desired sample rate times a number of analog video signals.

* * * * *